Oct. 7, 1952  P. L. HARTNETT  2,613,107

SWIRLING AND MIXING SIPPING STRAW

Filed Sept. 14, 1950

INVENTOR.
PAUL L. HARTNETT
BY
Charles R. Jay,
atty.

Patented Oct. 7, 1952

2,613,107

UNITED STATES PATENT OFFICE 2,613,107

SWIRLING AND MIXING SIPPING STRAW

Paul L. Hartnett, Leominster, Mass.

Application September 14, 1950, Serial No. 184,815

1 Claim. (Cl. 299—17)

This invention relates to a combined swirling and mixing device and sipping straw for beverages such as iced tea and mixed drinks; and the principal object of the invention is to provide a sipping straw or stem combined with stirring or mixing blades at one end thereof and means for crushing or muddling ice and mixed drink ingredients of any kind.

Another object of the invention resides in the provision of an elongated hollow sipping straw or stem provided with a series of radial blades at one end thereof, said blades terminating in flat edges at the end of the sipping straw so as to provide a crushing or muddling device composed of radial fingers, said blades having a convex edge outline so that when the stem is rotated between the fingers or hand of the user, the blades act to thoroughly stir drink ingredients and sugar in the bottom of a container.

Other objects and advantages of the invention will appear hereinafter.

Reference is to be had to the accompanying drawings, in which

In carrying out the invention, there is provided an elongated hollow stem 10 which is preferably made of extruded or molded plastic. This stem may be similar to or exactly the same as conventional sipping straws.

Figure 1:
Fig. 1 is a view in elevation illustrating the invention.
Figure 2:
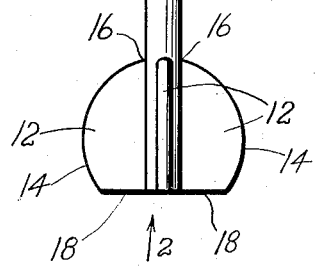
Fig. 2 is a bottom plan view thereof, looking in the direction of the arrow 2 in Fig. 1.
Figure 3:
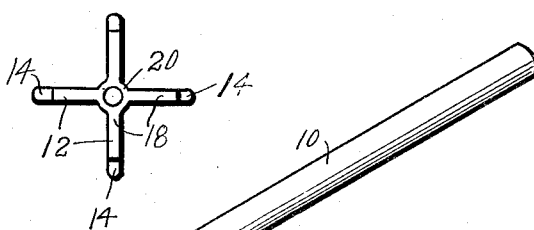
Fig. 3 is a perspective view of the device.

At one end of the stem 10 there are provided a series of radial blades 12. These blades may be all alike or they may be of different outlines as desired, but it is preferred that each blade shall have a curved convex edge as shown in Fig. 1 at 14. The length of the blades is very short compared to the over-all length of the sipping straw, but clearly the latter may be varied to any extent depending upon conditions for which it is desired to use the device.

The curved edges 14 extend into the sipping straw 10 at the points 16, but at the other ends thereof they are flat as at 18. The flat edges 18 are co-planar, both with themselves and with the terminal end 20 of the sipping straw.

It will be seen that the flat edges 18 and the terminal portion 20 of the straw provide a star-shaped crushing implement comprising a central circular portion having radial arms extending outwardly therefrom.

The sipping straw 10 may be used in the usual manner and it may also be grasped as a handle to use the edges 20 and 18 for crushing any ingredients or ice; furthermore, the stem 10 may be taken in the hands and twirled or rotated rapidly so that the blades 12 provide a relatively powerful swirling and mixing action. Therefore it will be seen that this invention provides a relatively simple implement having a triple function, that of a drinking straw, a crusher or muddler, and a mixer or swirler as above described.

Having thus described my invention and the advantages thereof, I do not wish to be limited to the details herein disclosed, otherwise than as set forth in the claim, but what I claim is:

An article of manufacture comprising a hollow sipping stem and a series of radially extending flat stirring blades at one end only of said stem, said blades being convex at the outermost radial edges and flat and co-planar at the extreme ends thereof at the intake end of the hollow stem to form a series of crushing or muddling edges arranged radially of the stem, said flat co-planar edges including a central ring-like connection forming the termination of the sipping stem.

PAUL L. HARTNETT.

REFERENCES CITED

The following references are of record in the file of this patent:

UNITED STATES PATENTS

| Number | Name | Date |
|---|---|---|
| 674,446 | Marx | May 21, 1901 |
| 1,494,742 | Hills | May 20, 1924 |